Oct. 30, 1956  J. L. GRATZMULLER  2,768,846
CONICALLY TAPERED DUAL SEAL RING PIPE CONNECTION
Filed March 2, 1953  2 Sheets-Sheet 1

Inventor
J. L. Gratzmuller
By Glascock Downing Reich
Attys

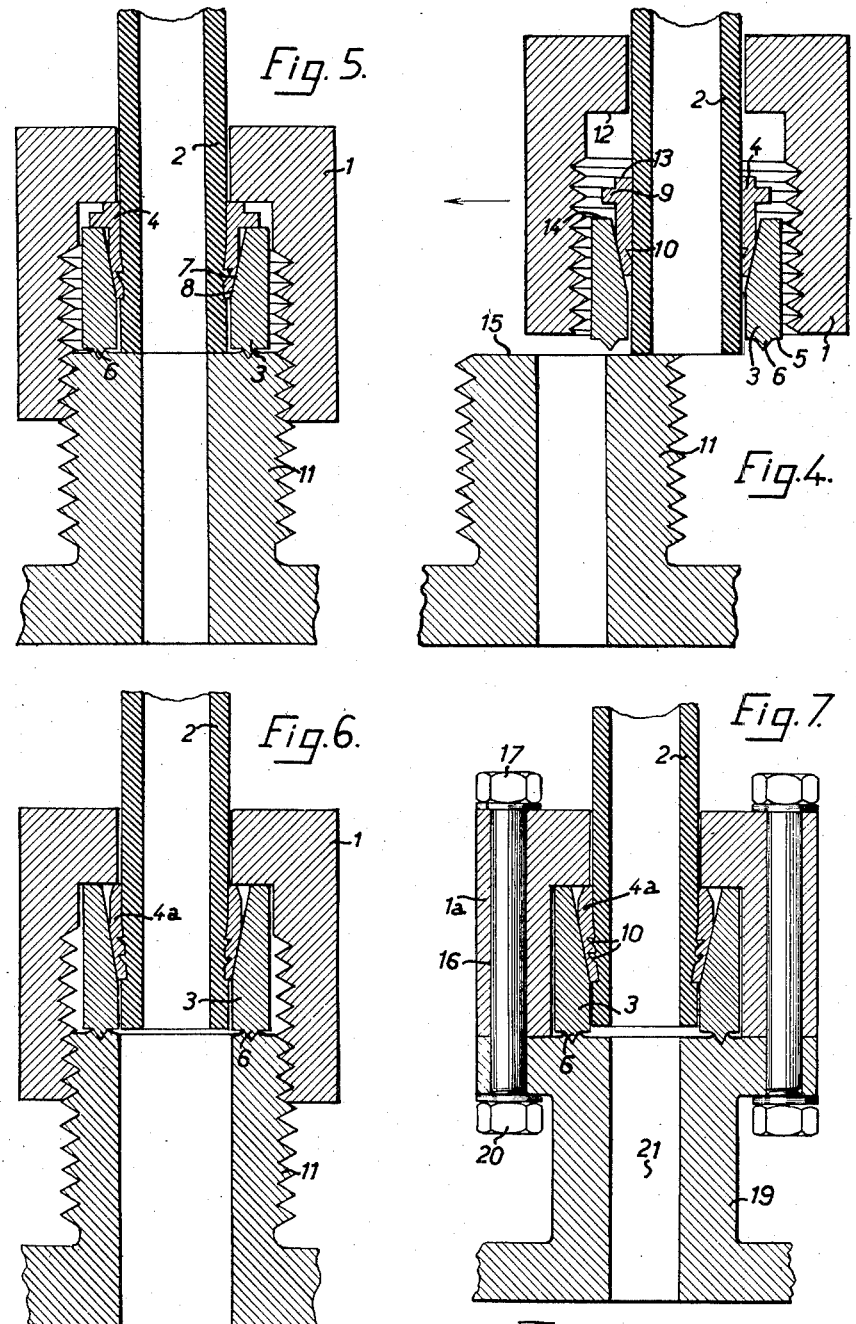

United States Patent Office 2,768,846
Patented Oct. 30, 1956

2,768,846

CONICALLY TAPERED DUAL SEAL RING PIPE CONNECTION

Jean Louis Gratzmuller, Paris, France

Application March 2, 1953, Serial No. 339,709

Claims priority, application France June 25, 1952

7 Claims. (Cl. 285—342)

This invention relates to pipe connections and, more particularly, to a device for connecting a pipe to a part having an opening, to establish a fluid-tight communication between said pipe and said opening.

An object of the invention is to provide a pipe connection of this type adapted to ensure a good tightness and a firm gripping of the pipe for a large range of materials and whatever thickness its wall may be.

Another object of the invention is to provide a pipe connection adapted to be attached on any opening, provided the edge of the same is adapted to act as an implantation surface for the terminal edge of the pipe connection.

Still another object of the invention is to provide a pipe connection adapted to be brought into assembling coaxial relative position with respect to the opening to which the pipe is to be connected by a displacement in any direction and, more particularly, in a direction transversal to the axis of said opening to permit connection even on an opening located in such an awkward place that it cannot be reached by an axial displacement of the pipe.

The pipe connection according to the invention is essentially constituted by two coaxial rings, the inner one of which is adapted to tightly receive the end of the pipe to be connected, while the outer one is adapted to be tightly pressed upon the edge of the opening, and by assembling means adapted to hold the assembly constituted by said pipe end and said rings tightly attached on the part in which said opening is provided.

A more particular object of the invention is to establish surface sealings between said pipe and inner ring, between the latter and said outer ring and between said outer ring and the edge of said opening, those three surface sealings being established and maintained under the mere action of said assembling means.

For this purpose, said outer ring is provided with at least one circular ridge adapted to bite into the edge of said opening, said inner and outer rings are provided with respective frusto-conical contact surfaces of the same conicity and said assembling means are so designed as to ensure, upon relative assembling displacement between said means and the part provided with said opening, first a forced penetration of said inner ring into said outer ring under relative sliding of said frusto-conical surfaces to thereby reduce the internal cross-section of said inner ring along the entire axial length of its frusto-conical contact surface, so that the outer wall of said pipe is tightly clamped in said inner ring along said axial length and then biting of said ridge into said opening edge.

Still another object of the invention is to ensure the desired firm gripping of said pipe in said inner ring without any risk of crushing or cutting said pipe.

For this purpose, the inner wall of said inner ring is provided with suitable sharp corrugations adapted to bite into the outer wall of said pipe upon the above- mentioned reduction of the cross-section of said inner ring under the action of said assembling means, and suitable abutment means are provided, either between said rings or between said outer ring and said assembling means, to limit the penetration of said inner ring into said outer ring and, thence, the degree of biting of said corrugations into said pipe outer wall.

In an embodiment of the invention, the above-mentioned assembling means are constituted by a skirt nut adapted to be screwed on an outer threading provided around the opening with which the pipe is to be connected, the inner wall of said nut being adapted to ensure the above-mentioned relative displacement between the rings.

In another embodiment, said assembling means are constituted by a cap surrounding said rings and the bottom of which is suitably perforated to accommodate the pipe, said cap being secured on the edge of the opening, e. g. by means of bolts.

Other objects and advantages of the invention will be apparent from the following detailed description, together with the accompanying drawings, submitted for purposes of illustrtaion only and not intended to define the scope of the invention, reference being had for that purpose to the subjoined claims.

In these drawings:

Fig. 4 is an axial sectional view showing a pipe connection according to Figs. 1 and 2 before its attachment to a threaded embossing.

Fig. 5 shows the same elements as Fig. 4, but after its assembling with the threaded embossing.

Fig. 6 shows the end of a pipe attached to a threaded embossing by means of a pipe connection according to Fig. 3 and Fig. 7 is an axial sectional view of a pipe connection according to the invention attached to the edge of an opening by means of a plurality of bolts.

Figure 1:
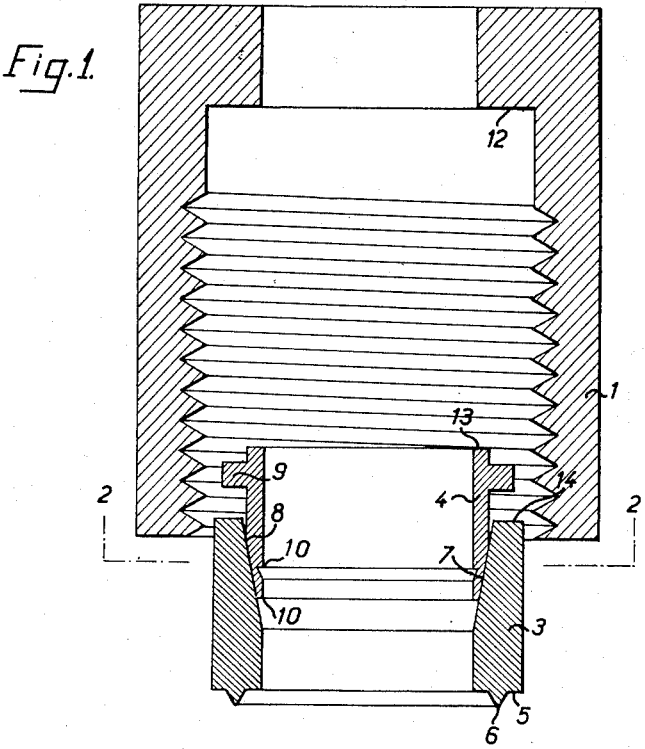
Fig. 1 is an axial sectional view of a pipe connection according to the invention.

Referring first to Fig. 1, there is shown at 1 a skirt nut, the bottom of which is provided with an axial opening, adapted to accommodate a pipe. The two rings of the coupling are shown at 3 and 4, respectively; the outer ring 3 is provided, on its terminal edge 5, with a sharp-edged circular rib 6 of predetermined axial thickness. The inner wall of said ring 3 is formed, at its end opposed to edge 5, with a frusto-conical surface 7.

The inner ring 4 is provided, at one end, in the example shown, with a frusto-conical tapering 8 having the same conicity as the surface 7 of the outer ring 3. The other end of the inner ring 4 projects from the corresponding end of the outer ring 3. The inner wall of ring 4 is provided with two circular sharp edges 10 adapted to bite into the outer wall of the pipe, upon contraction of ring 4 due to screwing of nut 1 on the part with which said pipe is to be connected, as explained hereunder.

In the embodiments shown in Figs. 1, 4 and 5, the outer periphery of the inner ring 4 is provided with an annular shoulder 9 so located that, when ring 4 has been displaced axially by a distance equal to that which separates the lower face of shoulder 9 (as shown in the drawings) from the upper edge of ring 3, the radial deformation of ring 4 and, thus, the degree of biting of the sharp edges 10 of said ring into the pipe, has a predetermined value.

In Figs. 4 and 5 is shown how a pipe 2 can be assembled with an embossing 11 which may be of any type and size, the only required feature being that said embossing is provided with an outer threading adapted to cooperate with the threading of nut 1. The skirt nut 1, ring 4 and ring 3 are first successively mounted on the end of pipe 2, as shown in Fig. 4, after which this whole assembly is brought into coaxial alignment with the embossing 11. It may be seen in Fig. 4 that this can be effected, if required, by a displacement in a direction transversal to the axis of said embossing, so that the pipe connection can be attached to the embossing, even if the same is located at an awkward place which does not permit assembling by a displacement in a generally axial direction.

Once the assembly 1—2—3—4 has been brought into coaxial alignment with embossing 11, the nut 1 is screwed on said embossing. Upon screwing of nut 1, the annular shoulder 12 exerts, on the edge 13 of ring 4, an axial pressure causing a forced penetration of said ring into ring 3. Since ring 3 is materially thicker than ring 4 and/or since the strength of ring 4 is smaller than the strength of ring 3, the latter is not substantially deformed, while ring 4 undergoes a radial deformation, as shown in Fig. 5, thus causing the corrugations 10 of ring 4 to bite into the external wall of pipe 2. The degree of biting is thus determined by the relative displacement between the two rings, i. e. by the axial distance separating the lower face of shoulder 9 of ring 4 and the corresponding edge 14 of ring 3. Once shoulder 9 has been brought into contact with the edge 14 of ring 3, a further screwing of nut 1 determines, on the one hand, a radial deformation of ring 4, due to the interaction of the conical surfaces of said rings and, on the other hand, a biting of the sharp edged ridge 6 into the edge 15 of embossing 11.

As already mentioned, the pipe connection according to the invention is so designed that it is always possible to screw the nut of the connection home without any risk of crushing or cutting the pipe. Thus, the required tightness is always obtained without any risk for the pipe, so that any non-particularly skilled operator can use the device. This particular feature of the pipe connection according to the invention permits, moreover, upon a suitable selection of rings 3 and 4, to attach even thin walled pipes, since the biting of corrugations 10 into the pipe is positively limited to a predetermined value. It will be understood, moreover, that the only parts to be accurately machined are rings 3 and 4 which, due to their simple shape, can be effected, without any mechanical complications and thus with a reduced cost. Rings 3 and 4 can be manufactured in mass production with the desired accurate dimensions, which permits an easy standardization of said rings.

A pipe coupling may be easily obtained by means of two pipe connections according to the invention, commonly attached to an intermediate pipe-union provided with a suitable bore to provide communication between the two pipes to be coupled.

Figure 3:
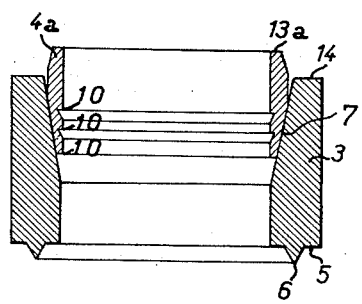
Fig. 3 is an axial sectional view of the two rings of a pipe connection according to the invention, the inner ring being slightly modfied with respect to Fig. 1.
Figure 2:
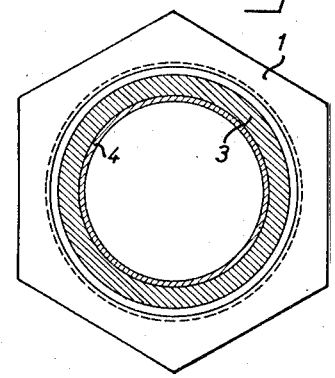
Fig. 2 is a section along line 2—2 of Fig. 1.

Figs. 3 and 6 show a pipe connection according to the invention, in which the shape of inner ring 4a has been slightly modified; in this embodiment, ring 4a is not provided with an outer shoulder, so that, upon screwing of nut 1 on embossing 11, for example, it is forced into the flaring of ring 3 until its upper edge has been brought to the same level as the corresponding edge of the outer ring 3, after which the shoulder 12 is brought into contact with said outer ring. From this position, upon further screwing of the nut, the shoulder 12 exerts an axial pressure simultaneously on both rings until the sharp edged ridge 6 of ring 3 has sufficiently bitten into the edge 15 of embossing 11.

In the example shown in Figs. 3, 6 and 7, the inner periphery of ring 4a has been provided with three circular sharp edges 10.

The pipe connection shown in Fig. 7 is of the same type as the embodiment shown in Figs. 1, 4 and 5, except that the assembling member 1a, instead of being directly screwed on a threaded embossing of the part on which the pipe is to be connected, has been provided with a plurality of holes 16 through which are passed bolts 17 cooperating with nuts 20 to attach the pipe connection on a flange 18 of a part 19. This arrangement is possible thanks to the fact that the pipe connection according to the invention is always squeezed home on the tube without any risk of cutting due to the biting action of corrugations 10, since said biting is limited, as already explained.

In this embodiment, as previously, the pipe connection may be brought into assembling position on the part 19 by a displacement in a direction making any angle with the axis of the opening 21.

In the use of a pipe connection according to the invention, it is not necessary to abut the pipe against the edge of the opening, as shown in Fig. 7.

Moreover, the inner and outer diameters of the pipe are not necessarily the same as those of the embossing, as shown in Fig. 6.

What is claimed is:

1. A device for establishing a fluid-tight connection between a pipe and the edge of an opening, comprising two rings to be mounted on said pipe end and an assembling element to maintain said rings and pipe end on said opening edge, a first one of said rings having a cylindrical outer wall portion continued by a tapering wall portion and at least one sharp circular edge defined by an annular groove on its inner wall radially opposite said tapering wall portion, the second ring having an inner cylindrical wall portion continued by a flaring portion of substantially the same conicity as said tapering wall portion to receive the same and terminating in an annular abutment end surface the internal diameter of which is greater than the external diameter of said first ring, at least one sharp circular ridge formed on the annular end surface of the second ring opposite said annular abutment surface thereof and adapted to engage said opening edge, said assembling element being constituted by a body surrounding the pipe, and presenting toward the rings a radially disposed flat surface, and means for forcibly moving said element toward said opening edge with said flat surface bearing against an end of said first ring to cause a forced penetration of said first ring into said second ring and a biting of said circular ridge into said opening edge, said forced penetration being limited to a predetermined value by said annular abutment end surface of the second ring, whereby fluid-tight connections are obtained between said pipe and said first ring by the contraction of the same along the entire axial length of said tapering wall portion with limited gripping penetration of said sharp circular edges into said tube wall, between the tapering and flaring wall portions of said first and second rings and between the said circular ridge on said second ring and said opening edge.

2. A device according to claim 1, in which said rings are made of a same material, said second ring being thicker than said first ring, whereby the first ring, upon forced penetration into the second ring, is materially more deformed than said second ring.

3. A device according to claim 1, in which said first ring is made of a material which has a lower strength than the material the second ring is made of, whereby, upon forced penetration of said first ring into said second ring, the former is materially more deformed than the latter.

4. A device according to claim 1, in which said opening is provided in an externally threaded part and in which said assembling element is a nut adapted to be screwed on said threaded part.

5. A device according to claim 1, in which said opening is provided in a flanged part and in which said assembling element is provided with a plurality of holes parallel to its axis and adapted to accommodate bolts to secure said element on said flanged part.

6. A device according to claim 1, in which the outer wall of said first ring comprises a radial flange adapted to engage said annular abutment end surface of the second ring to limit said forced penetration to said predetermined value when said assembling element is moved toward said opening edge.

7. A fluid pressure tight pipe connection comprising, in combination, a body member having a fluid conducting opening surrounded by a radial surface, two coaxial sealing ring members of tubular form axially movable relative to said pipe and having each two opposite annular end surfaces, a first one of said ring members having an end length portion of its outer wall tapering towards the corresponding annular end surface of said first ring member, a radial flange on the outer wall of said first ring member between said tapering wall portion and the other end surface of said first ring member, at least one sharp circular edge formed on the inner wall of said first ring member radially opposite said tapering wall portion thereof, the second ring member having an end length portion of its inner wall flaring towards one of said two opposite end surfaces of the second ring member to receive said tapering wall portion of the first ring member, said flaring wall portion having substantially the same conicity as said tapering wall portion and the internal diameter of said one end surface of the second ring member being greater than the external diameter of said first ring member, a circular sealing ridge formed on the other end surface of said second ring member adapted to engage said radial surface of the body member, and a nut member having threaded engagement with said body member and provided with an inner annular radial surface adapted to engage said one end surface of the first ring member, whereby the threading of the nut member onto the body member will force said tapering portion of the first ring member to move into said flaring portion of the second ring member and thereby force said circular ridge into said radial surface of the body member, said forced movement of the first ring member causing the tapering outer wall portion thereof to contract along its entire length so as to apply against the pipe with gripping penetration of said circular edge into the pipe wall, said gripping penetration being limited by the engagement of said radial flange of the first ring member with said one end surface of the second ring member.

References Cited in the file of this patent
UNITED STATES PATENTS

| | | |
|---|---|---|
| 1,665,346 | Clarke | Apr. 10, 1928 |
| 1,687,445 | Hazard | Oct. 9, 1928 |
| 1,779,220 | Strandell | Oct. 21, 1930 |
| 1,851,143 | Wilson | Mar. 29, 1932 |
| 1,936,815 | Wilkinson | Nov. 28, 1933 |
| 2,330,841 | Parker | Oct. 5, 1943 |
| 2,412,664 | Wolfram | Dec. 17, 1946 |
| 2,443,187 | Hobbs | June 15, 1948 |
| 2,508,763 | Mercier | May 23, 1950 |
| 2,687,315 | Courtot | Aug. 24, 1954 |

FOREIGN PATENTS

| | | |
|---|---|---|
| 342,539 | Great Britain | Feb. 5, 1931 |
| 367,186 | France | Aug. 24, 1906 |
| 571,450 | Great Britain | Aug. 24, 1945 |